(12) United States Patent
Gubler et al.

(10) Patent No.: US 7,121,490 B2
(45) Date of Patent: Oct. 17, 2006

(54) CHOPPER BLADE APPARATUS AND METHOD FOR REFINING PARTICLES

(75) Inventors: Scott Gubler, St. George, UT (US); Daniel J. Esplin, Washington, UT (US)

(73) Assignee: Deseret Laboratories, Inc., St. George, UT (US)

( * ) Notice: Subject to any disclaimer, the term of this patent is extended or adjusted under 35 U.S.C. 154(b) by 127 days.

(21) Appl. No.: 10/820,251

(22) Filed: Apr. 8, 2004

(65) Prior Publication Data

US 2005/0224611 A1    Oct. 13, 2005

(51) Int. Cl.
*B02C 18/14*    (2006.01)

(52) U.S. Cl. .................................... 241/282.1

(58) Field of Classification Search ............. 241/282.1, 241/282.2, 185.6, 169.1, 277
See application file for complete search history.

(56) References Cited

U.S. PATENT DOCUMENTS 3,325,107 A * 6/1967 Peterson .................. 241/101.2
4,239,161 A * 12/1980 Waltrip ..................... 241/46.02
6,186,426 B1 * 2/2001 Killer ....................... 241/46.11

OTHER PUBLICATIONS

Diosna, "Equipment for the Pharmaceutical Industry" (1 page), http://www.diosna.de/english/phar_komplett.html.
Quadro, "Comil Overdriven" (2 pages), http://www.quadro.com/comilo.html.
Chitra Engineers, "Multi Mill" (1 page), http://www.chitraengineers.com/htm/multimill.htm.

L. B. Bohle, Inc., "BOHLE BTS High-Speed Mill Fast and Efficient" (2 pages), http://www.lbbohle.com/milling/page2.html.
L. B. Bohle, Inc., "BOHLE BTS High-Speed Mill Increases productivity by more than 50%" (1 page), http://www.lbbohle.com/milling/page3.html.
L. B. Bohle, Inc., "BOHLE BTS High-Speed Mill Overview of performance features" (2 pages), http://www.lbbohle.com/milling/page4.html.
L. B. Bohle, Inc., "BOHLE PFG Low-Speed Mill Overview of performance features" (2 pages), http://www.lbbohle.com/milling/page5.html.
L. B. Bohle, Inc., "BOHLE PFG Low-Speed Mill The result: gentle treatment of your products combined with high throughput due to large screen surface" (2 pages), http://www.lbbohle.com/milling/page6.html.

* cited by examiner

*Primary Examiner*—Mark Rosenbaum
(74) *Attorney, Agent, or Firm*—David O. Seeley; William J. Athay; Holme Roberts & Owen, LLP (57) ABSTRACT

A particle refining apparatus to be integrated into a system including a containment device and an influent conduit. The influent conduit is configured to retain the particle refining apparatus and connected to the containment device. The particle refining apparatus including a shaft, a blade set attached near the end of the shaft and attachment couplings arranged within the influent conduit. A method for refining particles includes introducing particles into an influent conduit, chopping the particles to a desired size with an initial chopping apparatus, directing the chopped particles through the influent conduit, refining the particles to a desired size with a refining apparatus, and moving the particles continuously from the influent conduit through the refining apparatus and into a containment device.

30 Claims, 6 Drawing Sheets

CHOPPER BLADE APPARATUS AND METHOD FOR REFINING PARTICLES

BACKGROUND OF THE INVENTION

1. The Field of the Invention

The present invention generally relates to apparatus that chops or mills materials and more specifically, the invention relates to an inline apparatus that chops or mills process materials.

2. The Relevant Technology

During manufacturing of agglomerated powders, some large particles of powder clump together to form large masses of undried material that cannot be easily processed. The current practice is to run the process materials through stand alone machines that mill or chop materials before further drying and/or processing the materials. The machines break down the large masses to maintain a uniform particle size. The mixed powders are then transported to a different machine for drying the powders. The stand alone machines, however, add to the manufacturing time and cost. The stand alone machines also require personnel to transport the materials back and forth between different machines. In addition, the extra handling and transporting of the materials increases the chances of contamination and standard product loss since the materials are subject to separate processing.

In a related process, a machine that mills or chops the powders is connected with a drying bed. In this process, the powders are milled or chopped to a uniform particle size then routed through a conduit to the drying bed. When undried solvent-based and water-based granulated or agglomerated powders are transported through the conduit, however, the particles adhere to each other to create unworkable or very difficult clumps of material.

In view of the above and other related drawbacks and limitations identified in the relevant process material chopper, milling and sizing designs, there is a need for an inline chopper design that is designed to be adapted into the process machinery.

BRIEF SUMMARY OF THE INVENTION

In various exemplary embodiments of the present invention, a particle refining apparatus is made to be integrated into a system including a containment device and an influent conduit. The influent conduit is configured to retain the particle refining apparatus and to be connected to the containment device. The particle refining apparatus includes a shaft having distal and proximal ends, a blade set attached to the proximal end of the shaft, and attachment couplings arranged within the influent conduit. The attachment couplings are arranged to support the shaft.

The influent conduit may be divided to include a first portion for retaining the particle refining apparatus and a second portion for providing particle intake. The particle refining apparatus may further include a mount affixed to the first portion opposing the containment device. The particle refining apparatus may also include a motor mechanism attached to the mount and the distal end of the shaft. The particle refining apparatus may further including a variation device attached to the motor mechanism to vary an output speed of the motor mechanism.

In another embodiment of the present invention, a method for refining particles includes introducing particles into an influent conduit. In the next step, the particles are chopped to a desired size with an initial chopping apparatus. Then the chopped particles are directed through the influent conduit where the particles are further refined to a desired size with a refining apparatus. Because of the strategic location of the invention the particles continuously moved from the influent conduit through the refining apparatus and into a fluid bed drying and containment device with reduced reagglomeration and adherence to the fluid bed drying and containment device.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It should be appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made in detail to the preferred embodiments of the present invention, examples of which are illustrated in the accompanying drawings. The various exemplary embodiments provide a particle refining system such as an inline chopper design positioned between a wet agglomeration processing machine, and a fluid bed drying processor.

The present invention integrates a particle refining system such as an inline chopper design into a continuous and/or batch processing system. In various exemplary embodiments, a particle refining apparatus such as an inline chopper is positioned between a wet agglomeration processing machine, and a fluid bed dryer processor. Particles, such as wet agglomerated powder, can be delivered from a wet granulating machine through an influent conduit or connecting tube to the particle refining apparatus. The particle refining apparatus includes a blade set that may be driven by a variable speed electric drive system. The variable speed electric drive system allows an operator to adjust the rotational speed of the blade set to control the resultant particle size.

In the process, the particle refining apparatus chops or mills the particles to a desired particle size using the blade set positioned inside a containment device such as a fluid bed processing chamber. Then the particle refinement apparatus disperses the sized particles from the blade set in a more radial direction. The particles are directed in a radial direction so that the material does not impact and clump together against the opposite side of the containment device. The flow of the particles or agglomerated wet powders is maintained by a vacuum created in the fluid bed equipment and by a self-cleaning action of the particle refinement apparatus.

Figure 1:
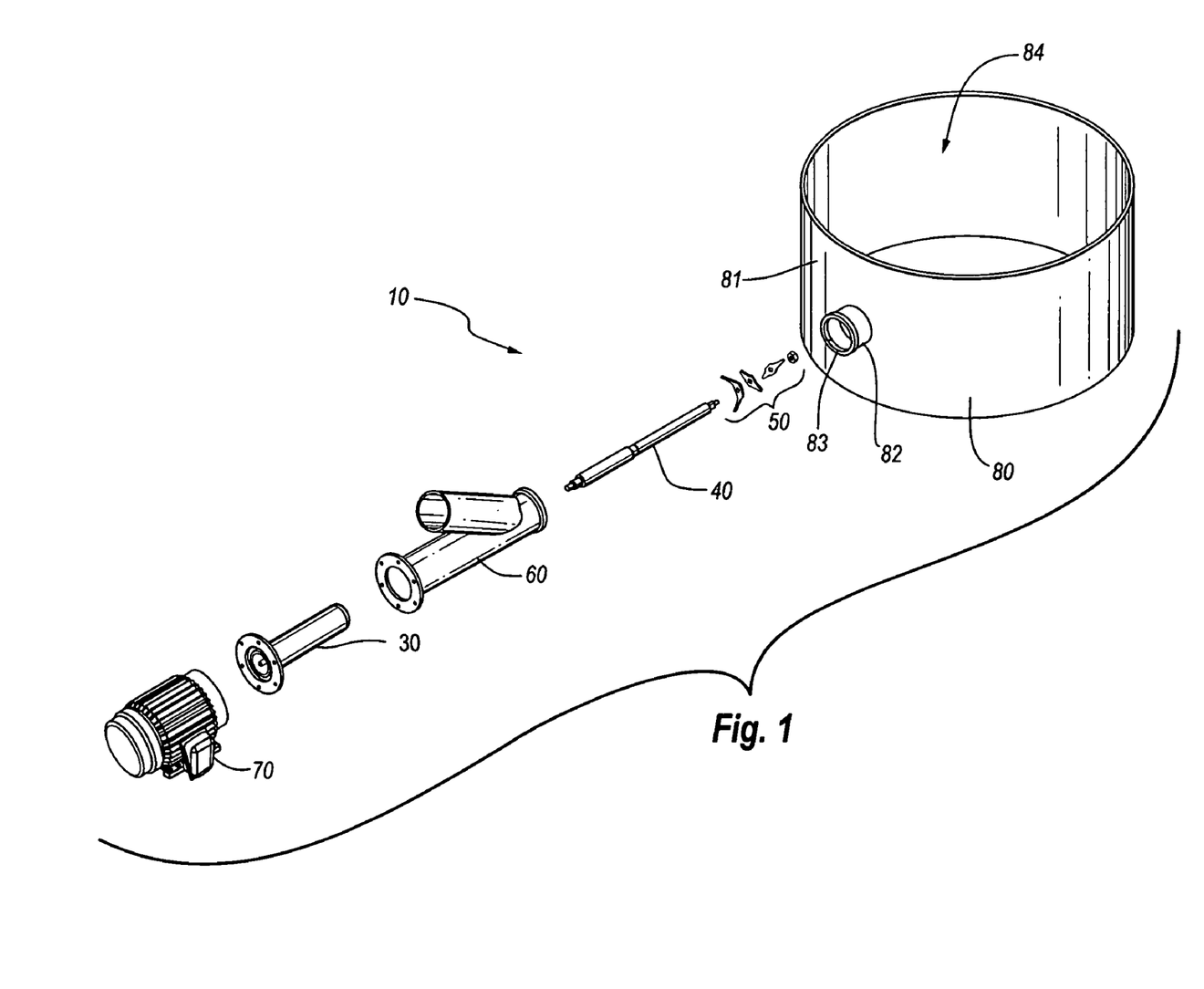
FIG. 1 is an exploded schematic view of an embodiment of a particle refining system in accordance with the present invention.

FIG. 1 illustrates one embodiment of a particle refining system 10 including a housing 30, a shaft 40, a blade set 50, an influent conduit 60, a motor mechanism 70 and a containment device 80. The containment device 80 contains the particles, such as wet granulation, after the particles are refined or milled. The containment device 80 is a storage unit or tank capable of processing or temporarily holding the particles.

The containment device 80 includes a tank wall 81 and a pipe 82. The tank wall 81 defines a containment area 84. The tank wall 81 in the present invention is cylindrical, however, the tank wall may be rectangular, conical, corrugated or the like. The particles enter the containment device 80 through the pipe 82. The pipe 82 may include a flange 83 to connect the influent stream to the containment device 80. In the alternative, the pipe 82 may be welded, glued or otherwise coupled to the containment device 80 and the influent conduit 60.

Figure 2:
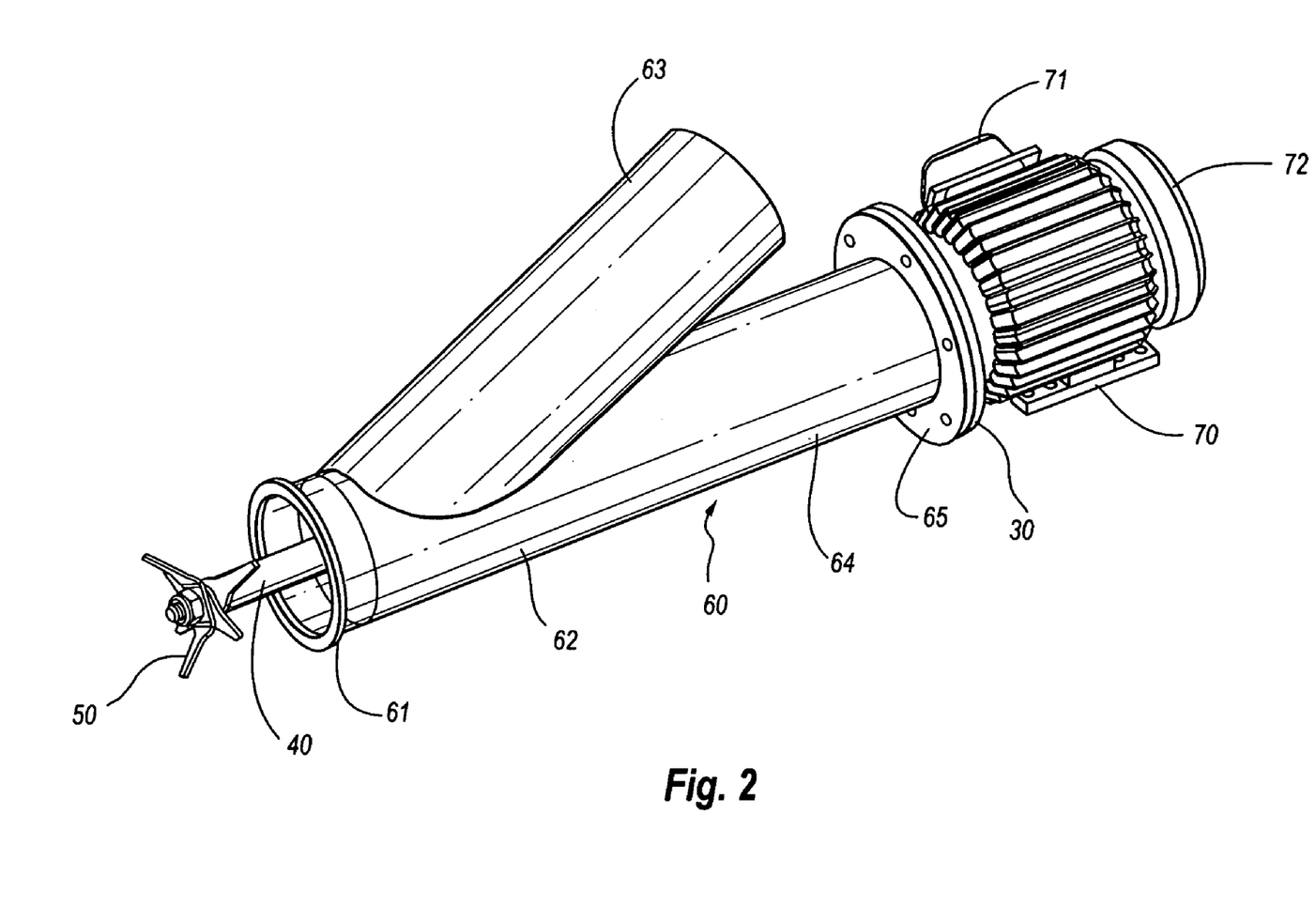
FIG. 2 is a schematic view of an embodiment of a particle refining apparatus in accordance with the present invention.

In FIG. 2, a particle refining apparatus is illustrated including the housing 30, the shaft 40, the blade set 50, the influent conduit 60 and the motor mechanism 70. The particle apparatus is provided with the influent conduit 60 designed to mount to the containment device 80.

The influent conduit 60 includes a first end 61, a second end 62 and an attachment device 65. The first end 61 connects to the containment device 80 using a flange or a pipe coupling (not shown). The first end 61 may also be welded, glued or otherwise coupled to the containment device 80. The second end 62 is further defined as including a first portion 63 and a second portion 64. The first portion 63 connects to the influent stream and provides a flow path for the particles to enter the particle refining apparatus. The second portion 64 is connected to the attachment device 65, such as a flange. The attachment device 65 is adapted to connect to the housing 30 using fasteners that attach through holes in flanges, welding, gluing or otherwise coupling the housing 30 and the influent conduit 60 together.

Although the preferred embodiment illustrates the influent conduit 60 including the first portion 63 as a single pipe, multiple pipes may be provided. Alternatively, the first portion 63 may be split into sections. The multiple pipes may be staggered in even intervals or at any point along the influent conduit 60. The multiple pipes may be used to add additional materials to be mixed in or refined in the process. Also, a blade set may be positioned at each pipe to further the mixing and/or refining process.

A motor mechanism 70 is also mounted to the housing 30. The motor mechanism 70 includes a variation device 71 and a motor winding 72. The variation device 71 may be an electrical device, such as a variable frequency device, or a mechanical device, such as a variable reducer. The motor winding 72 in the present invention is sized between about ½ HP and about 10 HP depending on the material being processed, for example, a motor winding 72 of about 7 HP can be used for heavier particles.

Figure 3:
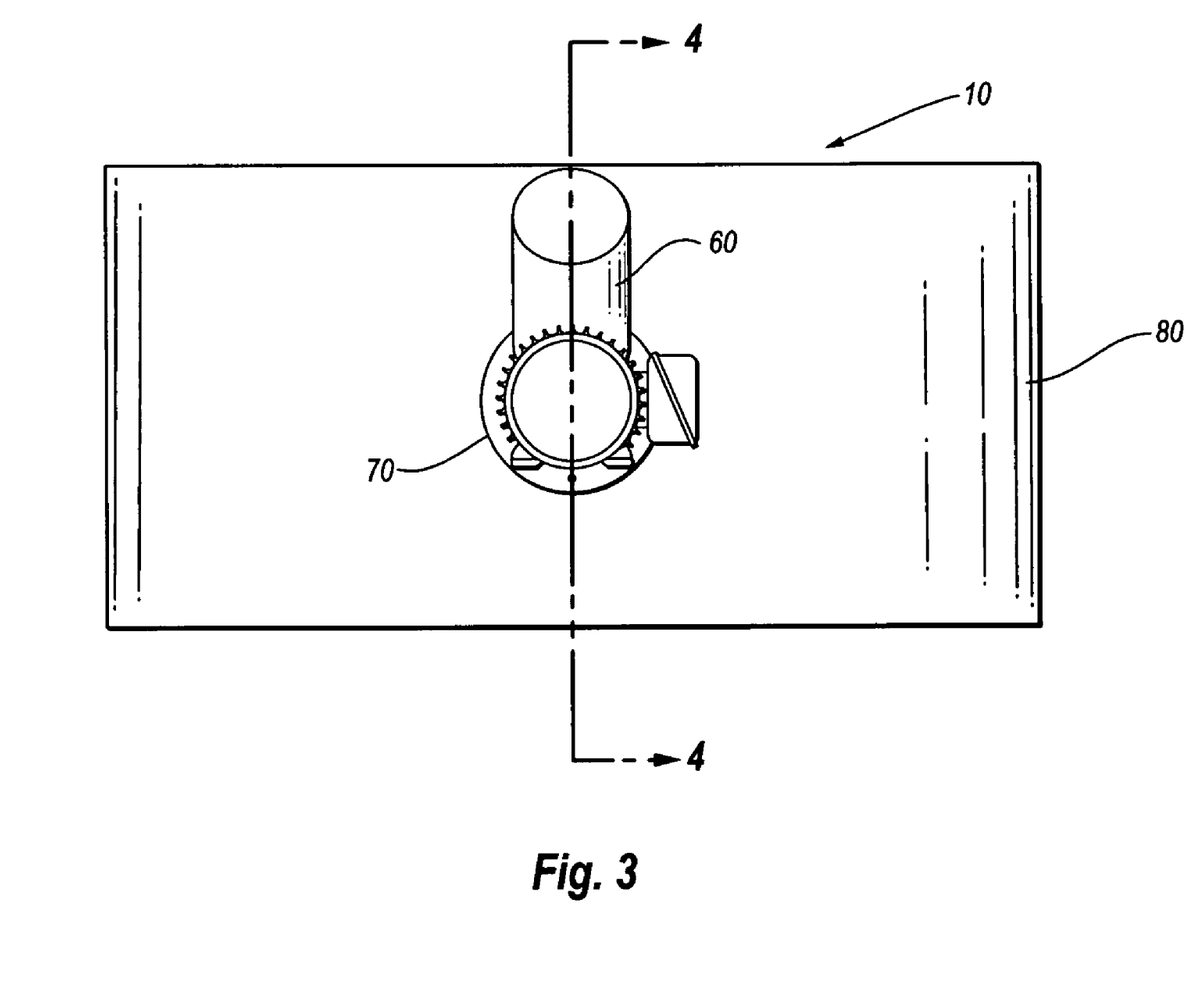
FIG. 3 is a side view of a particle refining system in accordance with the present invention.
Figure 4:
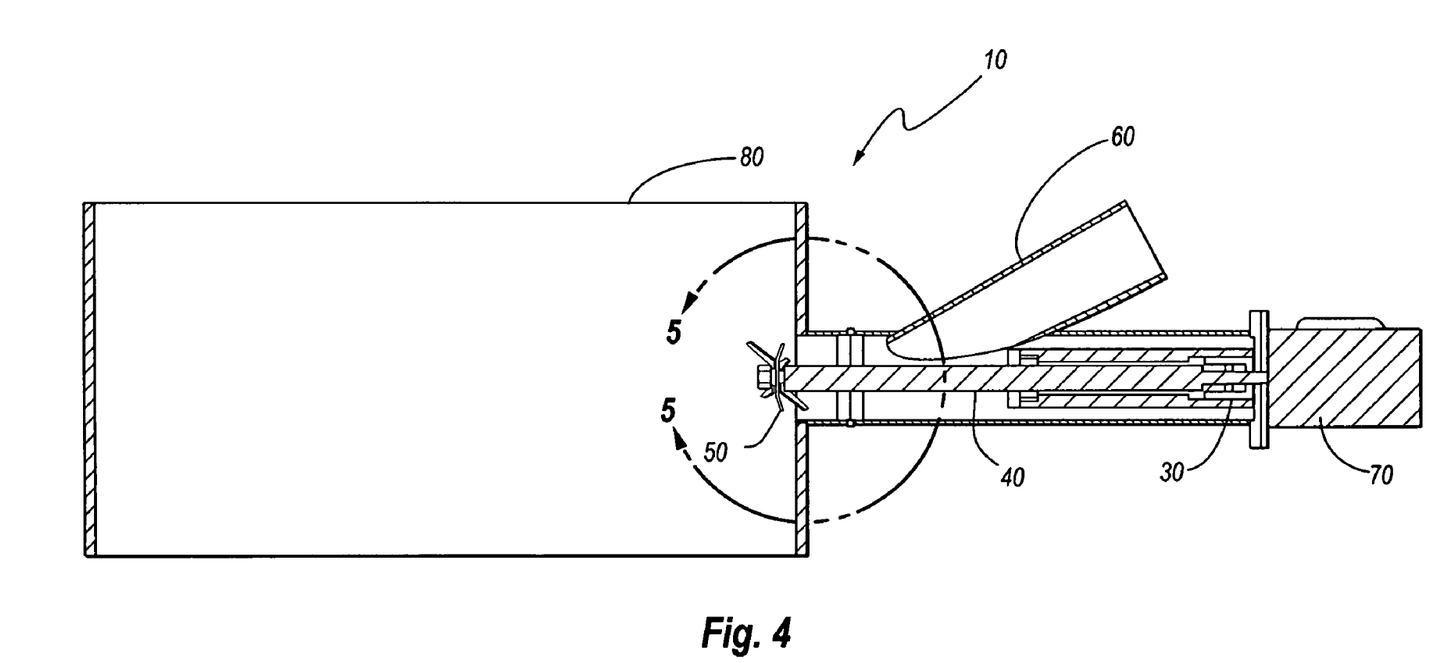
FIG. 4 is a sectional view of the particle refining system illustrated in FIG. 3.
Figure 5:
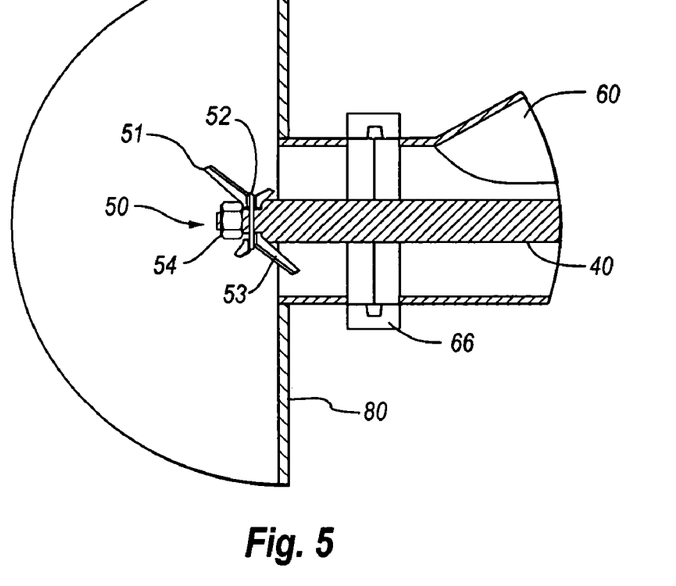
FIG. 5 is a detailed sectional view of the particle refining system illustrated in FIG. 4.

FIGS. 3–5 illustrate the particle refining system 10. The particle refining system 10 includes the housing 30, the shaft 40, the blade set 50, the influent conduit 60, the motor mechanism 70 and the containment device 80. The influent conduit 60 is connected to the pipe 82 of the containment device 80 using a coupling 66. Alternatively, flanges or a glued or welded joint may be used to connect the influent conduit 60 and the containment device 80.

FIG. 4 shows a section of the particle refining system 10 illustrated in FIG. 3. The shaft 40 and the influent conduit 60 are arranged so that at least a portion of the blade set 50 enters the containment device 80. The blade set 50 includes a outer blade 51, a flat blade 52 and an inner blade 53. The blade set 50 may include a variety of different quantities and styles of blades. Each blade in the blade set 50 may include a variety of shapes, sizes and quantity of edges. For example, a blade may comprise two triangular edges arranged on opposing sides. The blades may be manufactured from a rigid material, such as steel, stainless steel, titanium, aluminum, other metallic material, polymer or composite.

In the present embodiment, the outer blade 51 is shaped to face towards the containment device 80. The flat blade 52 is shaped to be on a radial line with the shaft 40. The inner blade 53 is shaped to face away from the containment device 80 and into the pipe 82. Each of the blades in the blade set 50 includes a square aperture arranged to offset each blade. For example, the blades may be offset 45 degree from each other. The blade set 50 is attached to the shaft 40 using a nut 54.

Although the present embodiment illustrates the blade set 50 at the outermost end of a proximal end 41 so that the blade set 50 is proximate the containment device 80, the blade set 50 may also be positioned inward from the outermost end of the shaft 40. Also, additional blade sets may be attached along the shaft 40 to provide further milling and refinement of the particles, and additional blade sets may have a different configuration than the blade set 50. The blade set 50 chops the material again and redirects the flow of the material so that the material does not collide and adhere to the tank wall 81 opposing the particle refining apparatus 20.

Figure 6:
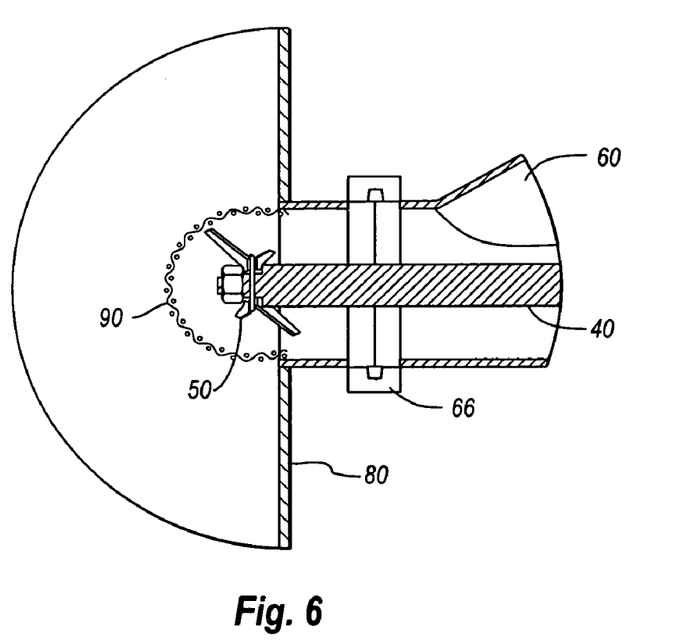
FIG. 6 is a detailed sectional view of another embodiment of a particle refining system in accordance with the present invention.

As shown in FIG. 6, a screen 90 may be added to the particle refining system 10 inline with the blade set 50. The screen 90 may have a variety of different mesh sizes and configurations. For example, a screen 90 having ¼ inch openings can be used. The screen 90 is placed adjacent the blade set 50 to regulate the particle size entering into the containment device 80. Accordingly, the particles are chopped by the blade set 50 until they are small enough to pass through the screen. The screen 90 provides a uniform particle size of the powder entering the containment device 80.

Figure 7:
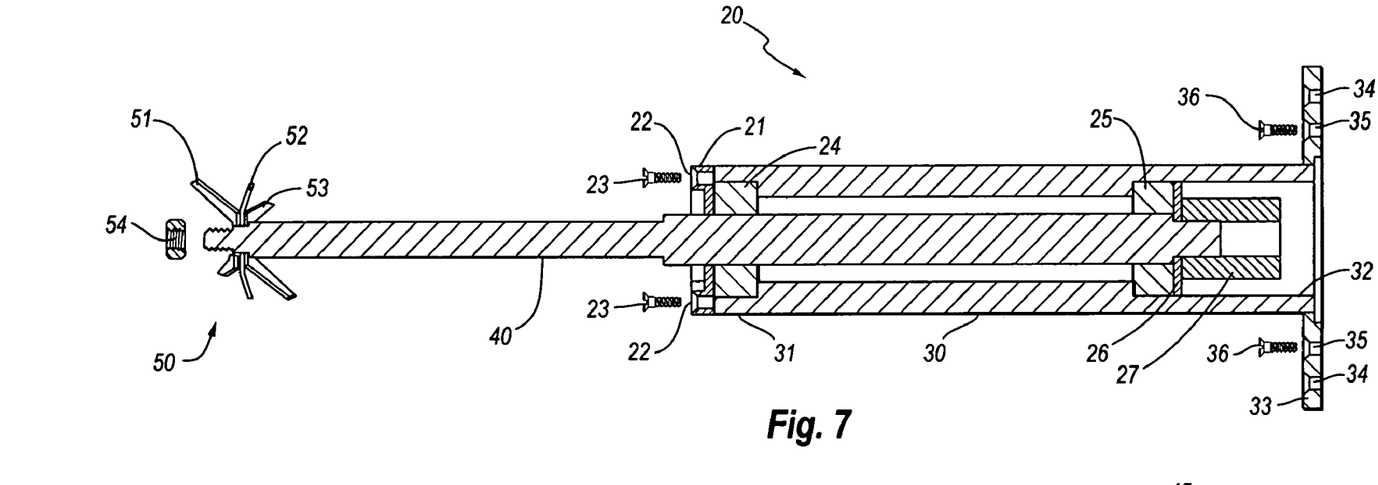
FIG. 7 is a sectional view of another embodiment of a particle refining apparatus in accordance with the present invention.

FIG. 7 illustrates an example of a particle refining apparatus 20. The particle refining apparatus 20 includes the housing 30, the shaft 40, the blade set 50 and attachment couplings. The attachment couplings may include a backing plate 21, fasteners 23, a first bearing 24, a second bearing 25, a bearing plate 26 and a motor coupling 27. Other couplings may be used to steady or hold the shaft 40 within the housing 30, such as plates, gears, sockets, rails, rods and the like. The housing 30 includes a first bearing end 31, a second bearing end 32 and a mount 33.

The first and second bearings 24, 25 hold the shaft 40 and allow the shaft 40 to rotate freely within the housing 30. The first and second bearings 24, 25 may include ball bearings, rolling-contact bearings, antifriction bearings, roller bearings, metallic and polymer bearings and other bearings adaptable to a shaft. The first bearing end 31 includes a lip that is sized to hold the first bearing 24. In addition, the second bearing end 32 includes a lip that is sized to hold the second bearing 25.

The first bearing 24 is held against the lip in the first bearing end 31 with the backing plate 21. The backing plate 21 includes a series of apertures 22 for attaching the backing plate 21 to the housing 30 using the fasteners 23. The apertures 22 may be arranged equally spaced on a radius from the centerline of the backing plate 21. For example, the present embodiment includes four apertures. The backing plate 21 may also include a seal ring to further prevent debris from entering the first bearing 24.

The second bearing 25 is held against the lip in the second bearing end 32 with the bearing plate 26. The motor coupling 27 may be used to hold the bearing plate 26 against the second bearing 25. One end of the motor coupling 27 is attached to the shaft 40 using a key and set screw or other locking device. The other end of the motor coupling 27 is attached to a shaft of the motor mechanism 70 also using a key and set screw or other locking device used to attach the motor mechanism 70 to the shaft 40.

The mount 33 is attached to the second bearing end 32 of the housing 30, for example, by welding. The mount 33 includes motor mounting apertures 35. Fasteners 36 are used to attach the motor mechanism 70 through the motor mounting apertures 35. The fasteners 36 and motor mounting apertures 35 are countersunk or recessed to allow the mount 33 and the attachment device 65 to abut flush against each other.

The mount 33 also includes a set of conduit mounting apertures 34 arranged on a radius outside the motor mounting apertures 35. The conduit mounting apertures 34 are used to attach the particle refinement apparatus 20 to the influent conduit 60.

Figure 8:
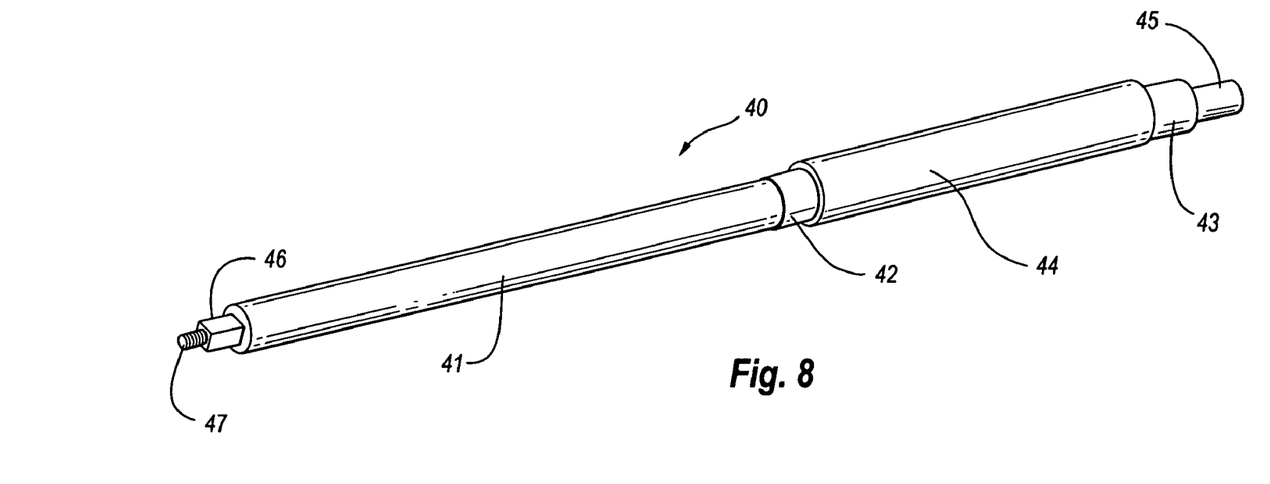
FIG. 8 is a schematic view of a shaft in accordance with the present invention.

In FIG. 8, the shaft 40 includes a proximal end 41, a first bearing portion 42, a second bearing portion 43, a distal end 44, a motor coupling portion 45, a blade mounting portion 46 and a blade fastening portion 47. The shaft 40 is manufactured from a rigid material, such as a metal or composite. Although a shaft is used in the present embodiment, a structural member such as a cage or tubing may be used. The proximal end 41, the first and second bearing portions 42, 43, the distal end 44 and the motor coupling portion 45 are cylindrical shaped. The first and second bearing portions 42, 43 are sized to fit the first and second bearings 24, 25, respectively. The blade mounting portion 46 is parallelepiped shaped to provide a mounting area for the blade set 50. The blade fastening portion 47 is threaded and positioned on the end of the blade mounting portion 46. The threads on the blade fastening portion 47 are sized to accept the nut 54. The nut 54 is used to hold the blade set 50 on the end of the shaft 40. Other locking devices may be used instead of a nut, for example, a pin, cap, key or weld and the like.

The blade set 50 is attached to the proximal end 41 and the motor mechanism 70 is attached to the distal end 44 of the shaft 40. The first bearing portion 42 is positioned between the proximal and distal ends 41, 42 of the shaft 40. The second bearing portion 43 is portioned on the distal end 44 with the motor coupling portion 45 on the outermost end. The motor coupling portion 45 is sized to fit the motor coupling 27.

The particle refining system 10 incorporates the particle refining apparatus 20 into a continuous processing system between a wet agglomeration processing machine and a fluid bed processor. In the system, particles, such as wet agglomerated powder, are introduced from a wet granulating machine through the influent conduit 60 to the particle refining apparatus 20. The particle refining apparatus 20 includes the motor mechanism 70 that rotates the shaft 40. The blade set 50 is attached to the proximal end 41 of the shaft 40 to chop or mill the particles to a desired particle size. The blade set 50 is positioned to direct the particles in a radial direction from the shaft 40 within the containment device 80.

The particle refinement apparatus 20 is designed to disperse the sized particles from the blade set 50 in a radial direction within the containment area 84. Since the particles are directed in a radial direction from the shaft 40, the particles do not impact and clump together against the opposite side of the containment device 80. The particle refinement apparatus 20 is designed to have a self-cleaning action to prevent the particles from adhering to the blade set 50.

A heater is positioned below the containment device 80. The heater heats the air to provide a continuous upward flow of air. The air flow creates a vacuum pulling the particles at a continuous rate from the fluid bed equipment. Other methods of creating a vacuum may also be provided, for example, a blower, fan, turbine, vacuum and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A particle refining apparatus comprising:
   a conduit to be integrated into a process system, the conduit being suitable for transporting a material to a containment device, the containment device having a wall;
   a shaft having distal and proximal ends, the shaft being disposed in at least a portion of the conduit;
   a blade set attached near the proximal end of the shaft, the blade set being positioned to span at least a portion of the wall of the containment device;
   attachment couplings disposed between the shaft and the conduit, the attachment couplings supporting the shaft and allowing the shaft to freely rotate.

2. The particle refining apparatus of claim 1, further comprising a screen attached to the end of the particle refining apparatus and adjacent the blade set.

3. The particle refining apparatus of claim 1, wherein the conduit is divided, including a first portion for retaining the shaft, the blade set and the attachment couplings, and a second portion for providing particle intake.

4. The particle refining apparatus of claim 3, further comprising a mount affixed to the first portion opposing the containment device, and a motor mechanism attached to the mount and the distal end of the shaft.

5. The particle refining apparatus of claim 4, further comprising a variation device attached to the motor mechanism to vary an output speed of the motor mechanism.

6. The particle refining apparatus of claim 1, wherein the shaft is arranged so that at least a portion of the blade set is positioned within the containment device.

7. The particle refining apparatus of claim 1, wherein the blade set includes a plurality of blades configured in an offset pattern.

8. The particle refining apparatus of claim 7, wherein at least one of the plurality of blades is formed to slant toward the containment device.

9. The particle refining apparatus of claim 7, wherein at least one of the plurality of blades is formed to slant into the conduit.

10. The particle refining apparatus of claim 7, wherein at least one of the plurality of blades is formed to slant toward the containment device, at least one of the plurality of blades is formed to slant away from the containment device and at least one of the plurality of blades is formed substantially straight on a radial line with the shaft.

11. A particle refining apparatus comprising:
a housing configured to be connected to a process system including a containment device and an influent conduit; the housing being connected to the containment device and the influent conduit, the containment device having a wall;
a shaft having distal and proximal ends, the shaft being disposed in at least a portion of the influent conduit;
a blade set attached near the proximal end of the shaft, the blade set being positioned to span at least a portion of the wall of the containment device; and
attachment couplings arranged within the housing, the attachment couplings supporting the shaft and allowing the shaft to freely rotate.

12. The particle refining apparatus of claim 11, further comprising a screen attached to the end of the particle refining apparatus and adjacent the blade set.

13. The particle refining apparatus of claim 11, further comprising a mount affixed to the housing, and a motor mechanism attached to the mount and the distal end of the shaft.

14. The particle refining apparatus of claim 13, further comprising a variation device attached to the motor mechanism to vary an output speed of the motor mechanism.

15. The particle refining apparatus of claim 11, wherein at least one of the housing and the shaft is arranged so that at least a portion of the blade set is positioned within the containment device.

16. The particle refining apparatus of claim 11, wherein the blade set includes a plurality of blades configured in an offset pattern.

17. The particle refining apparatus of claim 16, wherein at least one of the plurality of blades is formed to slant toward the containment device.

18. The particle refining apparatus of claim 16, wherein at least one of the plurality of blades is formed to slant into the housing.

19. The particle refining apparatus of claim 16, wherein at least one of the plurality of blades is formed to slant toward the containment device, at least one of the plurality of blades is formed to slant into the housing and at least one of the plurality of blades is formed substantially straight on a radial line with the shaft.

20. A particle refining apparatus comprising:
a housing configured to be connected to a process system including a containment device and an influent conduit, the housing being connected to the containment device and the influent conduit;
a shaft having distal and proximal ends, the shaft being disposed in at least a portion of the influent conduit;
a blade set attached near the proximal end of the shaft, the blade set being proximate to the containment device; and
attachment couplings arranged within the housing, the attachment couplings supporting the shaft and allowing the shaft to freely rotate,
wherein the influent conduit includes a first and second end, the first end being connected to the containment device and the second end having a split configuration, the second end including a first portion for connecting an influent stream to the influent conduit and a second portion for enclosing the particle refining apparatus.

21. The particle refining apparatus of claim 20, further comprising an attachment device affixed to the second portion, and a motor mechanism attached to the attachment device and the distal end of the shaft.

22. The particle refining apparatus of claim 21, further comprising a variation device attached to the motor mechanism to vary an output speed of the motor mechanism.

23. A particle refining system comprising:
a containment device having a wall;
an influent conduit; and
a refining apparatus positioned between the influent conduit and the containment device, the refining apparatus including:
a housing configured to be connected to the influent conduit and the containment device;
a motor attached to the housing;
a shaft having distal and proximal ends, the distal end of the shaft being attached to the motor, the shaft being disposed in at least a portion of the conduit;
a blade set attached near the proximal end of the shaft and positioned to span at least a portion of the wall of the containment device; and
attachment couplings arranged within the housing, the attachment couplings supporting the shaft.

24. The particle refining apparatus of claim 23, further comprising a screen attached to the end of the refining apparatus and adjacent the blade set.

25. The particle refining system of claim 23, further comprising a variation device attached to the motor to vary an output speed of the motor.

26. The particle refining system of claim 23, wherein the refining apparatus is arranged so that at least a portion of the blade set is positioned within the containment device.

27. The particle refining system of claim 23, wherein the blade set includes a plurality of blades configured in an offset pattern.

28. The particle refining system of claim 27, wherein at least one of the plurality of blades is formed to slant toward the containment device.

29. The particle refining system of claim 27, wherein at least one of the plurality of blades is formed to slant into the housing.

30. The particle refining system of claim 27, wherein at least one of the plurality of blades is formed to slant toward the containment device, at least one of the plurality of blades is formed to slant into the housing and at least one of the plurality of blades is formed substantially straight on a radial line with the shaft.

* * * * *